UNITED STATES PATENT OFFICE 2,120,474

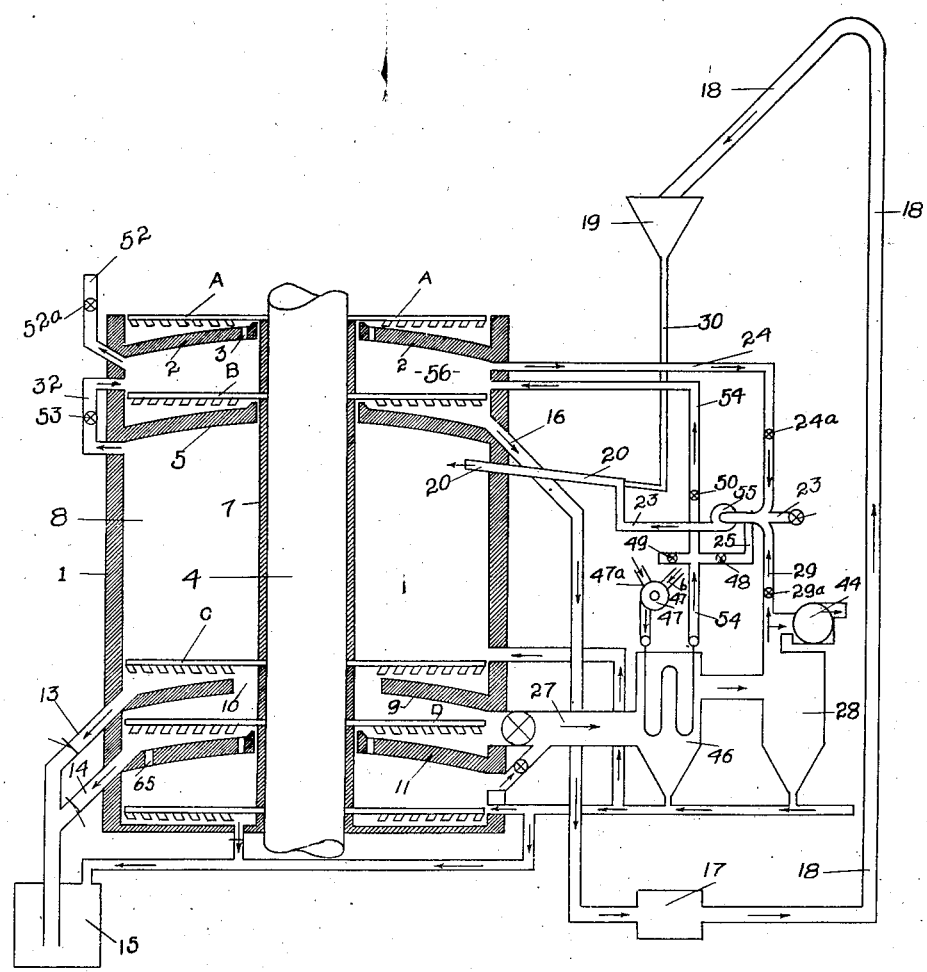
BYRON ANGUS STIMMEL.
KENNETH DUNCAN McBEAN.
GRAHAM CRUICKSHANK.
INVENTORS.
ATTORNEY.

APPARATUS FOR THE BURNING OF MINERAL SULPHIDES IN GASEOUS SUSPENSION

Byron Angus Stimmel, Kenneth Duncan McBean, and Graham Cruickshank, Trail, British Columbia, Canada, assignor to The Consolidated Mining & Smelting Company of Canada, Limited, Montreal, Quebec, Canada, a corporation of Canada Application July 6, 1935, Serial No. 30,190

1 Claim. (Cl. 266—20)

Our invention relates to the roasting of mineral sulphides such as ores, flotation concentrates and like material, in gaseous suspension, and is particularly directed to that type of charge which contains a high percentage of moisture and/or is deficient in thermal value, whereby the charge may be dried and desulphurized exclusively by the combustion of the sulphur content of the charge without the use of extraneous fuel.

In our United States Patent Nos. 1,884,348 and 1,963,282 we disclosed a method and apparatus for roasting mineral sulphides of zinc, iron, copper and lead, either singly or in combination, in gaseous suspension, characterized in that the charge, in a finely divided state, is blown into the combustion chamber and is disseminated concurrently with the air blast through it, for the exposure of every surface of each particle to the oxidizing action of the air. The roast is effected exclusively by the combustion of the sulphur content of the charge, supported by the air of the blast, for converting the sulphides into metallic oxides, some sulphates and sulphur dioxide. The temperature and the time of the roast are regulated for promoting the oxidation of the charge without fusion or incipient fusion, and with the formation of a minimum amount of ferrates when treating zinc sulphides containing iron. The roasted material settling at the bottom of the combustion chamber is removed for further processing and the gaseous products of combustion are exhausted from the combustion chamber having a high concentration of sulphur dioxide.

In the extensive industrial application of the method of burning mineral sulphides in gaseous suspension certain types of ores, flotation concentrates and like material have been encountered which contain a high percentage of moisture and/or are deficient in thermal value to such an extent that the drying, which is a necessary preliminary step in the process in order that the charge may be pulverized and introduced into the combustion chamber in a finely divided dry state, and the desulphurizing, cannot be accomplished exclusively by the combustion of the sulphur content of the charge but require supplemental heat from some extraneous source. This supplemental heat increases the cost of operation, reduces the tonnage of the furnace, and the gases therefrom have a deleterious effect on the purity and concentration of the sulphur dioxide bearing gases evacuated from the combustion chamber of the furnace.

We therefore have incorporated improvements in the method and apparatus disclosed in the hereinbefore mentioned patents, which improvements are also applicable to any of the processes in which mineral sulphides are burned in gaseous suspension, whereby the heat generated by the combustion of the sulphur content of the charge is efficiently recovered, returned to the process and utilized therein for the drying and desulphurizing of mineral sulphides having a high moisture content and/or a low thermal value, to effect the continuous operation of the process without the use of supplemental heat from any extraneous source.

The method by which we recover and utilize the heat generated by the combustion of the sulphur content of the charge is by circulating an oxygen bearing gas through one or more suitable heat exchange devices located in the path of flow of the hot gases evacuated from the combustion chamber of the furnace thereby effecting an exchange of heat between the hot exit gases and the oxygen bearing gas, and circulating the hot oxygen bearing gas to the various steps of the method determinable by the moisture content and thermal value of the charge being treated.

As a further feature we have found it advantageous in treating certain types of charges to increase the normal oxygen content of the oxygen bearing gas by mixing with it regulated amounts of oxygen for the purpose of aiding the combustion of the sulphur content of the charge in order to maintain the continuous operation of the furnace at its highest capacity without the use of supplemental heat from any extraneous source.

A complete understanding of our invention may be had from the following description and accompanying drawing in which is shown diagrammatically a vertical cross sectional view of the furnace and the associated parts suitable for carrying out our invention.

Like reference characters refer to like parts throughout the specification and drawing.

Referring to the drawing, the preferred embodiment of our invention herein illustrated may be correlated to the method and apparatus disclosed in the principal Patent Nos. 1,884,348 and 1,963,282, and it will only be necessary, therefore, to refer to such parts of the apparatus therein disclosed as may be necessary to give a complete understanding of our improvement.

The shaft furnace 1 is provided with a combustion chamber 8 of large cross sectional area and of relatively great depth, so proportioned that the finely divided particles blown into the upper portion thereof have ample room for free dispersal throughout the chamber area for unrestricted downward movement therethrough in an oxidizing atmosphere to permit the complete oxidation of the particles in gaseous suspension.

The settling hearth 9 at the lower part of the combustion chamber, on which the suspended particles eventually settle, has a circular opening 10, forming an annular opening around the insulating casing 7 of the vertical rotating shaft 4, which communicates with the settling hearth 11. The roasted particles settling on the hearths 9 and 11 may be separately evacuated from the oxidizing atmosphere of the combustion chamber through the conduits 13 and 14, which communicate with the storage bin 15, or through the drop-hole 65 in the hearth 11 for further processing.

The drying hearths 2 and 5 are located above the combustion chamber 8, the uppermost hearth 2 being provided with drop-holes 3 spaced at regular intervals about the vertical rotating shaft 4.

One end of the conduit 16 communicates with the periphery of the lower drying hearth 5 and the other end with the grinding mill or other suitable pulverizing apparatus 17. A suitable elevator 18 raises the pulverized material from the mill 17 to the hopper 19. The conduit 30 directs the flow of material from the hopper 19 into the nozzle 20 through which the particles of the charge, in a finely divided state, are blown into the combustion chamber concurrently with a blast of air.

The conduit 32 leads from the upper part of the combustion chamber 8 and connects with the drying chamber 56, formed between the drying hearths 2 and 5, and directs the flow of hot gases from the combustion chamber into the drying chamber.

Rabble arms A, B, C and D, secured to the vertical rotating shaft 4, are provided with rabbles which move on the hearths 2, 5, 9 and 11 respectively. The rabbles are suitably adjusted to agitate the material on those hearths and rabble it respectively towards and into the drop-hole 3, the conduit 16, and the conduits 13 and 14 or into the drop-hole 65 as desired.

The gaseous products of combustion are evacuated from the furnace by way of the main gas conduit 27 and directed to suitable dust-collecting chambers 28 where the entrained dust particles are precipitated. The gases, substantially free from solids, may be separated from the process through the conduit 29, the exhaustion assisted by the fan 44, or if for any reason it is desired to return part of the gases to the combustion chamber, this may be done by adjustment of the valve 29a in the conduit 29 thus directing the flow of the gas into the air conduit 23. The air conduit 23 communicates with the nozzle 20 and is provided with a fan 55 to force the air through the conduit and into the nozzle under pressure.

The gases introduced into the drying chamber 56 are evacuated therefrom through the conduit 24 which communicates at its other end with the air conduit 23. The rate of evacuation is controlled by the valve 24a inserted in the conduit for that purpose.

Referring now to the parts relating to our improvement. A suitable heat exchange device 46, preferably of the type containing a number of vertical cast iron pipes or tubes, provided with a scraping device for automatically cleaning the outside surfaces, is located in the path of flow of the hot gases evacuated from the combustion chamber of the furnace, preferably between the combustion chamber and the dust-collecting chamber 28, and so designed that the hot exit gases circulate through the heat exchange device in contact with the exposed surfaces of the tubes.

An oxygen bearing gas such as air or oxygen enriched air is circulated through the tubes by means of the fan 47 which is provided with an air inlet port 47a and an oxygen inlet port 47b connected to a suitable source of oxygen.

One end of the conduit 54, which is preferably insulated, communicates with the tubes of the heat exchange device 46, and the other end with the drying chamber 56. A valve member 50 is provided in the conduit to regulate the flow of gas therethrough. The conduit 25 communicates with the conduit 54, one end being open to the atmosphere, and the other end communicating with the air conduit 23. Valve members 48 and 49 are provided in the conduit 25 to permit the dissipation of the hot oxygen bearing gas to the atmosphere or direct it into the conduit 23 as desired.

The conduit 52, which is provided with a valve member 52a, permits the regulated evacuation of the gases from the drying chamber 56 to the atmosphere, and the valve member 53, provided in the conduit 32 permits the regulated flow of gases from the upper part of the combustion chamber 8 into the drying chamber 56.

The method of operating our improved method is dependent on (a) the moisture content and (b) the thermal value of the charge being treated. For example in the treatment of a high grade zinc concentrate containing a high percentage of moisture, say 12% or more, the charge is fed on to the drying hearth 2 whereon it is rabbled toward and into the drop-holes 3 to settle on the hearth 5 to be rabbled toward the periphery thereof and into the conduit 16 substantially free from moisture.

The dried charge passes through the conduit 16 into the pulverizing apparatus 17 wherein it is pulverized and directed on to the elevator 18 to be elevated thereby to the hopper 19. The finely divided material is fed in regulated amounts from the hopper 19 to the nozzle 20 by means of the conduit 30, and is blown into the combustion chamber 8 concurrently with a blast of an oxygen bearing gas such as air introduced through the air conduit 23.

The temperature of the combustion chamber is maintained preferably from 1650°–1700° F. exclusively by the combustion of the sulphur content of the finely divided particles disseminated therethrough, supported only by the oxygen content of the oxygen bearing gas introduced concurrently with the finely divided particles.

The majority of the suspended particles eventually settle on the hearth 9 and are rabbled toward the periphery into the conduit 13 or toward and into the opening 10 to settle on the hearth 11 whereon they are rabbled toward the periphery and into the conduit 14 or into the drop-hole 65 substantially free from sulphates and sulphur.

The gaseous products of combustion are evacuated from the combustion chamber 8 through the main gas conduit 27 to circulate through the heat exchange device 46 in contact with the exposed surfaces of the tubes of that device thus effecting an exchange of heat between the hot exit gases and the oxygen bearing gas circulated through the tubes by means of the fan 47. The hot oxygen bearing gas, heated to say 400° F., passes from the tubes of the heat exchange device 46 into the insulated conduit 54 whereby it is directed to the drying chamber 56, formed between the drying hearths 2 and 5, thereby maintaining a sufficiently high temperature within that chamber to abstract moisture from the charge on the drying hearths. The moisture laden gases may be evacuated from the drying chamber to the atmosphere through the conduit 52, if the ore is deficient thermally or if moisture in the exit gases is objectionable to further processing, or otherwise returned to the combustion chamber through the conduit 24 by suitable adjustment of the valves 52a and 24a.

In treating low grade concentrates in which the diluents are thermally inert, or in general any ores or concentrates in which the net thermal value is below a fairly definite minimum, the valves 50 and 49 are closed and the hot oxygen bearing gas is directed through the conduits 25 and 23, assisted by the fan 55, to the combustion chamber 8 to be introduced therein and utilized as secondary combustion air to aid and expedite the combustion of the sulphur content of the charge and ensure the complete oxidation of the charge.

It will be apparent from the above that further variations in the operation of the improved method may be made by directing part of the hot oxygen bearing gas to the drying chamber 56 and the remainder to the combustion chamber 8 by suitable adjustment of the valves 48, 49 and 50. Furthermore should the occasion arise that the hot gas is not required for any purpose within the method it can be dissipated to the atmosphere or directed to any other process wherein it can be used by closing the valves 48 and 50 and opening the valve 49.

In utilizing the hot oxygen bearing gas as secondary combustion air it will be apparent that by controlling the oxygen content of the gas by introducing regulated amounts of oxygen through the oxygen inlet port 47b it is possible to aid and expedite the combustion of the charge so that certain types of ores and concentrates having a net thermal value below that required to support the processes above described can be roasted in gaseous suspension which would otherwise require additional heat from some extraneous source to maintain the process in continuous operation. It will be understood, of course, that no fixed limits can be set for the amount of oxygen so introduced as the oxygen content will be determined by the thermal value of the charge being treated.

We have found it possible in the operation of our improved method to retain all the features of the principal patents which comprise, in general, controlling the temperature of the combustion chamber within the temperature limits which will result in a roasted product substantially free from sulphates and sulphur and at the same time preventing the fusion or incipient fusion of the particles of the charge, with the formation of a minimum amount of ferrates when treating zinc sulphides containing iron. To the principal method we have now incorporated improvements by which we are able to roast mineral sulphides containing a high percentage of moisture and/or of low thermal value exclusively by the combustion of the sulphur content of the charge which would otherwise necessitate the addition of supplemental heat from some extraneous source.

Having thus fully described our invention what we claim as new and desire to secure by Letters Patent is:—

An apparatus for drying and subsequently burning mineral sulphides in gaseous suspension which comprises an unobstructed combustion chamber; means for injecting finely divided mineral sulphides into the upper part of said combustion chamber together with an oxidizing gas and hot gases formed by the combustion of the sulphur content of the charge; means for preheating said oxidizing gas by heat exchange with the hot gases leaving the combustion chamber; a drying chamber located above said combustion chamber and having a settling hearth in the lower part thereof; means for introducing the aforesaid preheated oxidizing gas into said drying chamber and conduit means extending from said drying chamber to the atmosphere to permit a regulated evacuation of the moisture laden gases to the atmosphere.

BYRON ANGUS STIMMEL.
KENNETH DUNCAN McBEAN.
GRAHAM CRUICKSHANK.